United States Patent [19]

Phipps, Jr. et al.

[11] 4,115,333

[45] Sep. 19, 1978

[54] WARP-RESISTANT REINFORCED THERMOPLASTIC COMPOSITIONS COMPRISING POLYESTER RESINS AND ZINC STEARATE

[75] Inventors: Donald Lee Phipps, Jr., Mount Vernon; Allen Dale Wambach, Evansville, both of Ind.

[73] Assignee: General Electric Company, Pittsfield, Mass.

[21] Appl. No.: 778,945

[22] Filed: Mar. 18, 1977

[51] Int. Cl.$^2$ .................. C08G 63/02; C08G 63/62
[52] U.S. Cl. ..................... 260/22 R; 260/22 CQ; 260/31.8 XA; 260/860
[58] Field of Search ........ 260/22 CQ, 22 R, 31.8 XA, 260/860

[56] References Cited

U.S. PATENT DOCUMENTS

| 2,465,319 | 3/1949 | Whinfield et al. | 260/75 R |
|---|---|---|---|
| 3,028,365 | 4/1962 | Schnell et al. | 260/47 |
| 3,047,539 | 7/1962 | Pengilly | 260/75 R |
| 3,218,372 | 11/1965 | Okamura et al. | 260/860 |
| 3,334,154 | 8/1967 | Kim | 260/860 |
| 3,516,956 | 6/1970 | Reedy et al. | 260/22 R |
| 3,516,957 | 6/1970 | Gray et al. | 260/31.8 XA |
| 3,557,053 | 1/1971 | Miller | 260/45.7 |
| 3,575,931 | 4/1971 | Sherman | 260/31.8 XA |
| 3,671,487 | 6/1972 | Abolins | 260/40 R |
| 3,681,281 | 8/1972 | Juelke et al. | 260/45.8 N |
| 3,824,209 | 7/1974 | Anderson | 260/45.9 R |
| 3,830,771 | 8/1974 | Cohen et al. | 260/40 R |
| 3,833,685 | 9/1974 | Wambach | 260/860 |
| 3,915,926 | 10/1975 | Wambach | 260/40 R |
| 3,953,394 | 4/1976 | Fox et al. | 260/860 |
| 3,953,539 | 4/1976 | Kawase et al. | 260/860 |
| 3,956,229 | 5/1976 | Bollen et al. | 260/860 |
| 3,974,124 | 8/1976 | Pelham | 260/860 |

FOREIGN PATENT DOCUMENTS 1,358,080 6/1974 United Kingdom.

*Primary Examiner*—Ronald W. Griffin
*Attorney, Agent, or Firm*—Morgan, Finnegan, Pine, Foley & Lee

[57] ABSTRACT

Reinforced thermoplastic compositions are provided comprising a poly(1,4-butylene terephthalate) resin, a resin selected from a poly(ethylene terephthalate) resin, a polycarbonate resin or a mixture thereof, a fibrous glass reinforcement and a minor amount of zinc stearate. The compositions are moldable to articles having improved resistance to warpage during heat treatment in comparison with molding compositions of glass reinforced poly(1,4-butylene terephthalate).

16 Claims, No Drawings

WARP-RESISTANT REINFORCED THERMOPLASTIC COMPOSITIONS COMPRISING POLYESTER RESINS AND ZINC STEARATE

This invention relates to glass reinforced molding compositions which have improved heat distortion resistance in the molded article. More particularly, it pertains to compositions comprising a poly(1,4-butylene terephthalate) resin, a resin selected from poly(ethylene terephthalate) resin, a homopolycarbonate resin or a mixture thereof, a reinforcement therefor comprising glass fibers alone or admixture with a mineral filler and a minor amount of zinc stearate.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly(ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

It has been previously disclosed in co-pending application Ser. No. 662,910 filed Mar. 1, 1976, assigned to the same assignee as herein, that glass reinforced thermoplastic compositions of a polycarbonate resin and poly(1,4-butylene terephthalate) can be molded to articles having greater resistance to warpage or heat distortion, in comparison with glass fiber reinforced poly(1,4-butylene terephthalate) resins. It is further disclosed in co-pending application Ser. No. 753,861 filed Dec. 23, 1976, assigned to the same assignee as herein, that zinc stearate when added to polyester polyblends elevates notched Izod impact strength, while maintaining unnotched impact strength, flexural strength and tensile strength and dramatically reduces sample-to-sample variability in elongation. Also it is disclosed in co-pending application Ser. No. 753,863, filed Dec. 23, 1976, and assigned to the same assignee as herein, that glass fibers in combination with a mineral filler provide molded articles with improved resistance to heat distortion or warpage. In addition, it is disclosed in co-pending application Ser. No. 747,635, filed Dec. 6, 1976, assigned to the same assignee as herein, that compositions comprising poly(butylene terephthalate), poly(ethylene terephthalate), a polycarbonate and glass fiber have improved resistance to heat distortion and warpage.

It has now been discovered that blends of a poly(1,4-butylene terephthalate) resin and a polycarbonate resin reinforced with fibrous glass, when admixed with a small amount of zinc stearate possess even less inherent warpage in the molded article and good moldability when compared with compositions of glass fiber reinforced poly(1,4-butylene terephthalate). Moreover, the polycarbonate resin can be replaced in whole or in part with a poly(ethylene terephthalate) resin and part of the glass fiber reinforcement can be replaced with a mineral filler, e.g., talc or mica. The improved resistance to heat distortion is achieved without any appreciable decrease in other mechanical properties, such as heat resistance (as measured by the heat deflection temperature under load), notched Izod impact strength, tensile strength, modulus and flexural strength. In addition, the present compositions are less susceptible to increases in melt viscosity than the above-mentioned glass reinforced blends of poly(1,4-butylene terephthalate) and polycarbonate resins.

DESCRIPTION OF THE INVENTION

According to this invention, there are provided reinforced thermoplastic compositions having increased resistance to warpage in comparison with glass reinforced poly(1,4-butylene terephthalate), useful for molding, e.g., injection molding, compression molding, transfer molding, and the like, the compositions comprising:

(a) a poly(1,4-butylene terephthalate) resin;
(b) a second resin selected from:
  (i) a poly(ethylene terephthalate);
  (ii) a polycarbonate resin; or
  (iii) a mixture of (i) and (ii);
(c) a reinforcing agent comprising glass fibers alone or in admixture with a mineral filler in an amount at least sufficient to provide reinforcement; and
(d) a small, effective warp resistance improving amount of zinc stearate.

The polyester resins of the compositions of this invention are available commercially or can be prepared by known techniques such as by the alcoholysis of esters of terephthalic acid with ethylene glycol or butanediol and subsequent polymerization, by heating the glycols with the free acids or with halide derivatives thereof, and similar processes. These are described in U.S. Pat. Nos. 2,465,319 and 3,047,539, and elsewhere.

Illustratively, these high molecular weight polyesters will have an intrinsic viscosity of at least about 0.4 deciliters/gram and preferably, at least 0.7 deciliters/gram as measured in 60:40 phenol/tetrachloroethane mixture at 30° C.

The polycarbonate resins are preferably those which have repeating units of the formula

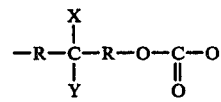

wherein each —R— is selected from the group consisting of phenylene, halo-substituted phenylene and alkyl substituted phenylene, and X and Y are each selected from the group consisting of hydrogen, hydrocarbon radicals free from aliphatic unsaturation and of radicals which together with the adjoining

atom form a cycloalkane radical, the total number of carbon atoms in X and Y being up to 12.

The preferred polycarbonate resins may be derived from the reaction of bisphenol-A and phosgene. These polycarbonates have from 100-400 recurring units of the formula

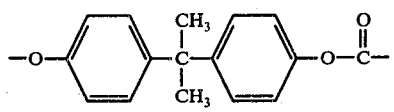

The polycarbonates are described in U.S. Pat. Nos. 3,028,365, 3,334,154 and 3,915,926, all of which are incorporated by reference to save further detail. The polycarbonate resin will preferably have an intrinsic viscosity of from about 0.3 to 1.0, more preferably from about 0.3 to 0.45, as measured in methylene chloride at 20° C.

The filamentous glass to be employed as reinforcement in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about ⅛ to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 and 0.125 (one-eighth) inch.

In general, best properties will be obtained if the sized reinforcement (c) comprises from at least about 1% by weight and, preferably, from about 1 to about 60% by weight, based on the combined weights of components (a), (b), (c) and (d).

The resinous components can vary widely in amount. Preferably, however, the composition will comprise from about 1 to about 98% by weight of poly(1,4-butylene terephthalate), from about 1 to about 98% by weight of component (b), i.e., the poly(ethylene terephthalate) resin, (i) the polycarbonate resin, (ii) or a mixture of (i) and (ii) the total percentages adding up to 100.

The compositions of this invention can include, in addition to fibrous glass reinforcement of the type described, mineral fillers in combination therewith, such as, e.g., talc, clay, silica, calcium silicate, mica, and the like, and preferably talc, especially preferably finely ground talc of up to 325 mesh particle size. The mineral fillers, if present, will generally comprise from about 10 to about 70 parts by weight per 100 parts by weight of reinforcing agent (c) in combination.

The amount of zinc stearate can vary, but in general an amount will be used which is small enough to enhance warp resistance, but not so much as to adversely affect other properties. Specifically, good results will be obtained if the zinc stearate comprises from about 0.05 up to about 5 parts by weight based on 100 parts by weight of resinous components (a) and (b). Especially satisfactory results will be obtained if the zinc stearate comprises from about 0.1 to about 1.0 parts by weight based on 100 parts by weight of resinous components (a) and (b).

Other ingredients, such as dyes, pigments, stabilizers, plasticizers, flame retardants, drip retardants, and the like can be added for their conventionally employed purposes. Illustrative flame retardant additives are disclosed in U.S. Pat. Nos. 3,833,685, 3,915,926 and 3,671,487, which are hereby incorporated by reference. Other flame retardants are disclosed in U.S. Pat. Nos. 3,681,281, 3,557,053 and 3,830,771 and U.K. Pat. No. 1,358,080, all of which are incorporated by reference.

The compositions of this invention can be prepared by a number of procedures. In one way, the reinforcement, e.g., glass fibers, and, optionally, mineral filler, is put into an extrusion compounder with the resinous components and zinc stearate to produce molding pellets. The reinforcement is dispersed in a matrix of the resin and zinc stearate in the process. In another procedure, the reinforcement (c) is mixed with the resins and zinc stearate by dry blending, then either fluxed on a mill and comminuted, or they are extruded and chopped. The reinforcing agent can also be mixed with the resins and zinc stearate and directly molded, e.g., by injection or transfer molding techniques.

It is always important that all of the ingredients: resins, reinforcement, zinc stearate and any optional conventional additives be as free from water as possible.

In addition, compounding should be carried out to ensure that the residence time in the machine is short; the temperature is carefully controlled; the friction heat is utilized; and an intimate blend between the resin and the reinforcement is obtained.

Although it is not essential, best results are obtained if the ingredients are pre-compounded, pelletized and then molded. Pre-compounding can be carried out in conventional equipment. For example, after carefully pre-drying the polyesters and/or polycarbonate resins and the reinforcing agent, e.g., under vacuum at 100° C. for 12 hours, a single screw extruder is fed with a dry blend of the ingredients, the screw employed having a long transition section to ensure proper melting. On the other hand, a twin screw extrusion machine, e.g., a 28 mm Werner Pfleiderer machine can be fed with resin and additives at the feed port and reinforcement down stream. In either case, a generally suitable machine temperature will be about 450° to 570° F.

The pre-compounded composition can be extruded and cut up into molding compounds such as conventional granules, pellets, etc., by standard techniques.

The composition can be molded in any equipment conventionally used for glass-filled thermoplastic compositions, e.g., a Newbury type injection molding machine with conventional cylinder temperatures, e.g., 525° F. and conventional mold temperatures, e.g., 150° F.

DESCRIPTION OF THE PREFERRED EMBODIMENT

The following examples illustrate the invention. They are set forth as a further description but are not to be construed as limiting the invention thereto.

EXAMPLE 1

A dry blend of poly(1,4-butylene terephthalate), intrinsic viscosity 0.8 dl/g., melt viscosity 1700 poise, a polycarbonate resin (LEXAN 121, General Electric Co., intrinsic viscosity 0.45 dl/g.), ⅛″ glass fibers (Owens Corning OCF 419), Ferro 904 antioxidant and zinc stearate are compounded and extruded at 450°–570° F. in an extruder. The extrudate is pelletized and injection molded at 525° F. (mold temperature 150° F.). For comparison purposes a composition is prepared without zinc stearate. The formulations and physical properties obtained are shown in Table 1.

Table 1.

Physical Properties of Reinforced Compositions

| Ingredients (parts by weight) | 1 | 1A* |
|---|---|---|
| poly(1,4-butylene terephthalate) | 50 | 50 |
| polycarbonate resin | 20 | 20 |
| fibrous glass reinforcement ⅛ inch | 30 | 30 |
| antioxidant | 0.05 | 0.05 |
| zinc stearate | 0.2 | — |
| Properties | | |
| Heat Deflection Temp., ° F. 264 psi | 380 | 400 |
| Notched Izod impact, ft.lbs./in. | 1.7 | 1.7 |
| Unnotched Izod impact, ft.lbs./in. | 11.9 | 12.5 |
| Tensile strength, psi | 18,600 | 16,500 |
| Flexural modulus, psi | 1,109,000 | 1,095,000 |
| Flexural strength, psi | 29,000 | 30,600 |
| Warp on 4 inch Disc (mm.) | 0 | 0 |
| Warp after 30 min. at 350° F. (mm.) | 10 | 19 |

*control - typical properties

When the composition of this invention (Example 1) is injection molded into a four inch disc the warpage after heating is only 10 mm. In contrast thereto, an identical part molded from the control sample (1A*) has a significantly increased warpage of 19 mm., which is, however significantly better than the 25 mm. found with polycarbonate omitted (see later).

EXAMPLES 2–4

Dry blends of poly(1,4-butylene terephthalate), intrinsic viscosity 0.8 dl./g., optionally poly(ethylene terephthalate), intrinsic viscosity 0.62 dl./g., optionally a polycarbonate resin (LEXAN 121, General Electric Company, intrinsic viscosity, 0.45 dl./g.), ⅛ inch glass fibers (OCF 419), Ferro 904 antioxidant, mold release agent, optionally talc, and zinc stearate are compounded and extruded at 520° F. The extrudates are pelletized and injection molded at 525° F. (mold temperature 150° F.). For comparison purposes two compositions are prepared without zinc stearate, and without zinc stearate and either poly(ethylene terephthalate) or a polycarbonate resin. The formulations and the physical properties obtained are shown in Table 2.

Table 2.

Physical Properties of Reinforced Compositions

| Example Ingredients (parts by weight) | 2 | 2A* | 3 | 4 | 4A* |
|---|---|---|---|---|---|
| poly(1,4-butylene terephthalate) | 50 | 70 | 50 | 45 | 45 |
| poly(ethylene terephthalate) | 20 | — | — | 20 | 20 |
| polycarbonate resin | — | — | 20 | 10 | 10 |
| fibrous glass reinforcement | 30 | 30 | 30 | 10 | 10 |
| talc | — | — | — | 15 | 15 |
| Ferro 904/mold release | 0.05/.1 | 0.05/.1 | 0.05/.1 | 0.05/.1 | 0.05/.1 |
| zinc stearate | 0.1 | — | .1 | .1 | — |
| Properties | | | | | |
| Heat deflection temperature, ° F. at 264 psi | 390 | 406 | 336 | 360 | 347 |
| Notched Izod impact, ft.lbs./in. | 1.9 | 2.0 | 2.0 | .88 | .88 |
| Unnotched Izod impact, ft.lbs./in. | 14 | 12 | 14 | 7.9 | 7.5 |
| Flexural strength, psi | 25,000 | 26,000 | 26,000 | 18,200 | 17,000 |
| Tensile strength, psi | 15,000 | 17,000 | 17,000 | 12,800 | 12,000 |
| Flexural modulus, psi | 965,000 | 955,000 | 1,074,000 | 1,011,000 | 838,000 |
| Warp as molded (mm. in 4 in.) | 0 | 15 | 0 | 0 | 0 |
| Warp after 30 min. at 350° F. | 19 | 25 | 18 | 8 | 12 |

*Control tests

Examples 2 and 3 show that zinc stearate permits replacement of poly(butylene terephthalate) with poly(ethylene terephthalate) with minimal (except for heat distortion temperature with 20 parts of polycarbonate) undersirable effect and improved warp resistance. Example 4 in comparison with Control 4A shows a striking improvement in warp resistance when the reinforcement comprises a combination of glass fibers and mineral filler (Emtal talc, minus 325 mesh).

Obviously, other modifications and variations of the present invention are possible in the light of the above teachings. It is therefore, to be understood that changes may be made in the particular embodiments described above which are within the full intended scope of the invention as defined in the appended claims.

We claim:

1. A thermoplastic molding composition which, after molding, has increased resistance to warpage in comparison with glass fiber reinforced poly(1,4-butylene terehthalate), the composition consisting essentially of, in intimate admixture:
    (a) a poly(1,4-butylene terephthalate) resin;
    (b) a second resin selected from:
        (i) a poly(ethylene terephthalate);
        (ii) a polycarbonate; or
        (iii) a mixture of (i) and (ii);
    (c) a reinforcing agent comprising glass fibers alone or in admixture with a mineral filler in an amount at least sufficient to provide reinforcement; and
    (d) a small effective warp resistance improving amount of zinc stearate.

2. A composition as defined in claim 1 wherein component (a) comprises from 1 to 99 parts by weight and component (b) comprises from 99 to 1 parts by weight per 100 parts by weight of the total resinous components in the composition.

3. A composition as defined in claim 2 wherein the polycarbonate resin has an intrinsic viscosity of from about 0.3 to about 0.45 deciliters per gram when measured in a solution in methylene chloride at 20° C.

4. A composition as defined in claim 1 wherein the reinforcing agent component (c) is present in an amount of at least about 1 part by weight per 100 parts by weight of the combined components (a), (b), (c) and (d).

5. A composition as defined in claim 4 wherein the reinforcing agent (c) is present in an amount of from about 1 to about 60 parts by weight per 100 parts by weight of the combined components (a), (b) and (c).

6. A composition as defined in claim 1 wherein the zinc stearate is present in an amount comprising from about 0.05 up to about 5 parts by weight based on 100 parts by weight of resinous components (a) and (b).

7. A composition as defined in claim 6 wherein the zinc stearate comprises from about 0.1 to about 1.0 parts by weight based on 100 parts by weight of resinous components (a) and (b).

8. A composition as defined in claim 6 wherein the polycarbonate resin consists of from 100 to 400 of said repeating units.

9. A composition as defined in claim 1 wherein reinforcing agent component (c) comprises glass fibers and fine particle size ground mica.

10. A composition as defined in claim 9 wherein the mica has a particle size of less than 325 mesh.

11. A composition as defined in claim 1 wherein each resin component (a) and (b) (i) has an intrinsic viscosity of at least about 0.4 deciliter per gram when measured in a solution in 60:40 mixture of phenol and tetrachloroethane at 30° C.

12. A composition as defined in claim 1 wherein the polycarbonate resin has an intrinsic viscosity of at least about 0.3 deciliters per gram when measured in a solution in methylene chloride at 20° C.

13. A composition as defined in claim 1 wherein the polycarbonate resin (b) (ii) has repeating units of the formula

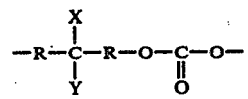

wherein each —R— is selected from the group consisting of phenylene, halo-substituted phenylene and alkyl substituted phenylene, and X and Y are each selected from the group consisting of hydrogen, hydrocarbon radicals free from aliphatic unsaturation and of radicals which together and with the adjoining

atom form a cycloalkane radical, the total number of carbon atoms in X and Y being up to 12.

14. A composition as defined in claim 13 wherein the polycarbonate resin (b) (ii) has repeating units of the formula

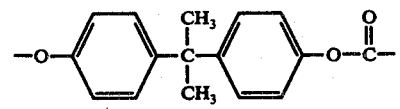

15. A composition as defined in claim 12 wherein the zinc stearate is present in an amount comprising from about 0.05 to up to about 5 parts by weight based on 100 parts by weight of components (a) and (b).

16. A composition as defined in claim 15 wherein the zinc stearate comprises from about 0.05 to about 1.0 parts by weight based on 100 parts by weight of components (a) and (b).